US010118308B2

(12) United States Patent
Gass et al.

(10) Patent No.: US 10,118,308 B2
(45) Date of Patent: Nov. 6, 2018

(54) SYSTEMS TO MOUNT AND INDEX RIVING KNIVES AND SPREADERS IN TABLE SAWS

(71) Applicant: SD3, LLC, Tualatin, OR (US)

(72) Inventors: Stephen F. Gass, West Linn, OR (US); J. David Fulmer, West Linn, OR (US); James F. W. Wright, Sherwood, OR (US)

(73) Assignee: SawStop Holding LLC, Tualatin, OR (US)

( * ) Notice: Subject to any disclaimer, the term of this patent is extended or adjusted under 35 U.S.C. 154(b) by 100 days.

(21) Appl. No.: 14/517,542

(22) Filed: Oct. 17, 2014

(65) Prior Publication Data

US 2015/0107427 A1 Apr. 23, 2015

Related U.S. Application Data

(60) Provisional application No. 61/892,246, filed on Oct. 17, 2013.

(51) Int. Cl.

| | |
|---|---|
| ***B23D 19/00*** | (2006.01) |
| ***B23D 45/00*** | (2006.01) |
| ***B27B 3/38*** | (2006.01) |
| ***B27B 3/28*** | (2006.01) |
| ***B26D 1/18*** | (2006.01) |
| ***B27G 19/08*** | (2006.01) |

(52) U.S. Cl.

CPC ........... *B27G 19/08* (2013.01); *Y10T 83/2077* (2015.04); *Y10T 83/7726* (2015.04)

(58) Field of Classification Search

CPC ..... B27G 19/08; B27G 19/02; Y10T 83/2077; Y10T 83/7726; B27B 5/29

USPC ..... 83/102.1, 440.2, 477.2, 478, 471.2, 438, 83/102; 403/323, 325, 326, 97, 93, 96

See application file for complete search history.

(56) References Cited

U.S. PATENT DOCUMENTS

| | | | |
|---|---|---|---|
| 146,886 | A | 1/1874 | Doane et al. |
| 162,814 | A | 5/1875 | Graves et al. |
| 261,090 | A | 7/1882 | Grill |
| 264,412 | A | 9/1882 | Kuhlmann |
| 299,480 | A | 5/1884 | Kuhlman et al. |
| 302,041 | A | 7/1884 | Sill |
| 307,112 | A | 10/1884 | Groff |
| 509,253 | A | 11/1893 | Shields |

(Continued)

FOREIGN PATENT DOCUMENTS

| | | |
|---|---|---|
| DE | 917746 | 9/1940 |
| DE | 2917497 | 4/1979 |

(Continued)

OTHER PUBLICATIONS

SI16WA-WF Circular Saw with Tilting Blade Spare Parts Catalogue, SCMI Corporation, Norcross, GA, Nov. 1986 and 1991

(Continued)

*Primary Examiner* — Ghassem Alie
*Assistant Examiner* — Bharat C Patel

(57) ABSTRACT

Mounting systems to secure and index riving knives and spreaders in table saws are disclosed. One embodiment may include three mounts or screws attached to an elevation carriage. A clamp plate fits over the heads of the mounts and a handle pivots to move the clamp plate against flanges on the heads of the mounts to clamp a riving knife or spreader in place.

4 Claims, 14 Drawing Sheets

(56) References Cited

U.S. PATENT DOCUMENTS

| | | | |
|---|---|---|---|
| 545,504 | A | 9/1895 | Hoover |
| 869,513 | A | 10/1907 | Pfeil |
| 997,720 | A | 7/1911 | Troupenat |
| 1,037,843 | A | 9/1912 | Ackley |
| 1,050,649 | A | 1/1913 | Harrold et al. |
| 1,054,558 | A | 2/1913 | Jones |
| 1,074,198 | A | 9/1913 | Phillips |
| 1,082,870 | A | 12/1913 | Humason |
| 1,101,515 | A | 6/1914 | Adam |
| 1,126,970 | A | 2/1915 | Folmer |
| 1,132,129 | A | 3/1915 | Stevens |
| 1,148,169 | A | 7/1915 | Howe |
| 1,154,209 | A | 9/1915 | Rushton |
| 1,228,047 | A | 5/1917 | Reinhold |
| 1,240,430 | A | 9/1917 | Erickson |
| 1,244,187 | A | 10/1917 | Frisbie |
| 1,255,886 | A | 2/1918 | Jones |
| 1,258,961 | A | 3/1918 | Tattersall |
| 1,311,508 | A | 7/1919 | Harrold |
| 1,324,136 | A | 12/1919 | Turner |
| 1,381,612 | A | 6/1921 | Anderson |
| 1,397,606 | A | 11/1921 | Smith |
| 1,427,005 | A | 8/1922 | McMichael |
| 1,430,983 | A | 10/1922 | Granberg |
| 1,450,906 | A | 4/1923 | Anderson |
| 1,464,924 | A | 8/1923 | Drummond |
| 1,465,224 | A | 8/1923 | Lantz |
| 1,496,212 | A | 6/1924 | French |
| 1,511,797 | A | 10/1924 | Berghold |
| 1,526,128 | A | 2/1925 | Flohr |
| 1,527,587 | A | 2/1925 | Hutchinson |
| 1,553,996 | A | 9/1925 | Federer |
| 1,616,478 | A | 2/1927 | Watson |
| 1,640,517 | A | 8/1927 | Procknow |
| 1,662,372 | A | 3/1928 | Ward |
| 1,701,948 | A | 2/1929 | Crowe |
| 1,711,490 | A | 5/1929 | Dummond |
| 1,712,828 | A | 5/1929 | Klehm |
| 1,774,521 | A | 9/1930 | Neighbour |
| 1,807,120 | A | 5/1931 | Lewis |
| 1,811,066 | A | 6/1931 | Tannewitz |
| 1,879,280 | A | 9/1932 | James |
| 1,904,005 | A | 4/1933 | Masset |
| 1,938,548 | A | 12/1933 | Tautz |
| 1,993,219 | A | 3/1935 | Merrigan |
| 2,007,887 | A | 7/1935 | Tautz |
| 2,010,851 | A | 8/1935 | Dummond |
| 2,075,282 | A | 3/1937 | Hedgpeth |
| 2,095,330 | A | 10/1937 | Hedgpeth |
| 2,106,321 | A | 1/1938 | Guertin |
| 2,121,069 | A | 6/1938 | Collins |
| 2,131,492 | A | 9/1938 | Ocenasek |
| 2,163,320 | A | 6/1939 | Hammond |
| 2,168,282 | A | 8/1939 | Tautz |
| 2,261,696 | A | 11/1941 | Ocenasek |
| 2,265,407 | A | 12/1941 | Tautz |
| 2,286,589 | A | 6/1942 | Tannewitz |
| 2,299,262 | A | 10/1942 | Uremovich |
| 2,313,686 | A | 3/1943 | Uremovich |
| 2,328,244 | A | 8/1943 | Woodward |
| 2,352,235 | A | 6/1944 | Tautz |
| 2,392,486 | A | 1/1946 | Larsen |
| 2,425,331 | A | 8/1947 | Kramer |
| 2,434,174 | A | 1/1948 | Morgan |
| 2,466,325 | A | 4/1949 | Ocenasek |
| 2,496,613 | A | 2/1950 | Wooward |
| 2,517,649 | A | 8/1950 | Frechtmann |
| 2,518,684 | A | 8/1950 | Harris |
| 2,530,290 | A | 11/1950 | Collins |
| 2,554,124 | A | 5/1951 | Salmont |
| 2,556,548 | A | 6/1951 | Modderman |
| 2,562,396 | A | 7/1951 | Schutz |
| 2,572,326 | A | 10/1951 | Evans |
| 2,590,035 | A | 3/1952 | Pollak |
| 2,593,596 | A | 4/1952 | Olson |
| 2,601,878 | A | 7/1952 | Anderson |
| 2,623,555 | A | 12/1952 | Eschenburg |
| 2,626,639 | A | 1/1953 | Hess |
| 2,661,780 | A | 12/1953 | Morgan |
| 2,678,071 | A | 5/1954 | Odium et al. |
| 2,690,084 | A | 9/1954 | Van Dam |
| 2,695,638 | A | 11/1954 | Gaskell |
| 2,704,560 | A | 3/1955 | Woessner |
| 2,711,762 | A | 6/1955 | Gaskell |
| 2,719,547 | A | 10/1955 | Gjerde |
| 2,722,246 | A | 11/1955 | Arnoldy |
| 2,731,049 | A | 1/1956 | Akin |
| 2,736,348 | A | 2/1956 | Nelson |
| 2,737,213 | A | 3/1956 | Richards et al. |
| 2,758,615 | A | 8/1956 | Mastriforte |
| 2,786,496 | A | 3/1957 | Eschenburg |
| 2,810,408 | A | 10/1957 | Boice et al. |
| 2,852,047 | A | 9/1958 | Odium et al. |
| 2,873,773 | A | 2/1959 | Gaskell |
| 2,876,809 | A | 3/1959 | Rentsch et al. |
| 2,954,118 | A | 9/1960 | Anderson |
| 2,984,268 | A | 5/1961 | Vuichard |
| 3,005,477 | A | 10/1961 | Sherwen |
| 3,011,610 | A | 12/1961 | Stiebel et al. |
| 3,105,530 | A | 10/1963 | Peterson |
| 3,129,731 | A | 4/1964 | Tyrrell |
| 3,186,256 | A | 6/1965 | Reznick |
| 3,224,474 | A | 12/1965 | Bloom |
| 3,232,326 | A | 2/1966 | Speer et al. |
| 3,249,134 | A | 5/1966 | Vogl et al. |
| 3,276,497 | A | 10/1966 | Heer |
| 3,315,715 | A | 4/1967 | Mytinger |
| 3,356,111 | A | 12/1967 | Mitchell |
| 3,456,696 | A | 7/1969 | Gregory et al. |
| 3,538,964 | A | 11/1970 | Warrick et al. |
| 3,540,338 | A | 11/1970 | McEwan et al. |
| 3,554,067 | A | 1/1971 | Scutella |
| 3,566,934 | A | 3/1971 | Thrasher |
| 3,581,784 | A | 6/1971 | Warrick |
| 3,613,748 | A | 10/1971 | De Pue |
| 3,621,894 | A | 11/1971 | Niksich |
| 3,670,788 | A | 6/1972 | Pollak et al. |
| 3,688,815 | A | 9/1972 | Ridenour |
| 3,754,493 | A | 8/1973 | Niehaus et al. |
| 3,785,230 | A | 1/1974 | Lokey |
| 3,805,639 | A | 4/1974 | Peter |
| 3,805,658 | A | 4/1974 | Scott et al. |
| 3,808,932 | A | 5/1974 | Russell |
| 3,829,970 | A | 8/1974 | Anderson |
| 3,861,016 | A | 1/1975 | Johnson et al. |
| 3,880,032 | A | 4/1975 | Green |
| 3,889,567 | A | 6/1975 | Sato et al. |
| 3,905,263 | A | 9/1975 | Smith |
| 3,922,785 | A | 12/1975 | Fushiya |
| 3,935,777 | A | 2/1976 | Bassett |
| 3,945,286 | A | 3/1976 | Smith |
| 3,946,631 | A | 3/1976 | Malm |
| 3,949,636 | A | 4/1976 | Ball et al. |
| 3,953,770 | A | 4/1976 | Hayashi |
| 3,974,565 | A | 8/1976 | Ellis |
| 3,994,192 | A | 11/1976 | Faig |
| 4,026,174 | A | 5/1977 | Fierro |
| 4,026,177 | A | 5/1977 | Lokey |
| 4,070,940 | A | 1/1978 | McDaniel et al. |
| 4,077,161 | A | 3/1978 | Wyle et al. |
| 4,085,303 | A | 4/1978 | McIntyre et al. |
| 4,090,345 | A | 5/1978 | Harkness |
| 4,249,442 | A | 2/1981 | Fittery |
| 4,255,995 | A | 3/1981 | Connor |
| 4,270,427 | A | 6/1981 | Colberg et al. |
| 4,276,799 | A | 7/1981 | Muehling |
| 4,294,013 | A | 10/1981 | Krieg |
| 4,305,442 | A | 12/1981 | Currie |
| 4,319,146 | A | 3/1982 | Wires, Sr. |
| 4,334,450 | A | 6/1982 | Benuzzi |
| 4,418,597 | A | 12/1983 | Krusemark et al. |
| 4,427,042 | A | 1/1984 | Mitchell et al. |
| 4,557,168 | A | 12/1985 | Tokiwa |
| 4,559,858 | A | 12/1985 | Laskowski et al. |

(56) References Cited

U.S. PATENT DOCUMENTS 4,576,073 A 3/1986 Stinson
4,599,927 A 7/1986 Eccardt et al.
4,615,247 A 10/1986 Berkeley
4,625,604 A 12/1986 Handler et al.
4,637,289 A 1/1987 Ramsden
4,657,428 A 4/1987 Wiley
4,694,721 A 9/1987 Brickner, Jr.
4,721,023 A 1/1988 Bartlett et al.
4,756,220 A 7/1988 Olsen et al.
4,774,866 A 10/1988 Dehari et al.
4,805,504 A 2/1989 Fushiya et al.
4,805,505 A 2/1989 Cantlin
4,875,398 A 10/1989 Taylor et al.
4,934,233 A 6/1990 Brundage et al.
4,962,685 A 10/1990 Hagstrom
4,965,909 A 10/1990 McCullough et al.
5,020,406 A 6/1991 Sasaki et al.
5,042,348 A 8/1991 Brundage et al.
5,052,255 A 10/1991 Gaines
5,094,000 A 3/1992 Becht et al.
5,116,249 A 5/1992 Shiotani et al.
5,123,317 A 6/1992 Barnes, Jr. et al.
5,156,508 A 10/1992 Grisley
5,174,349 A 12/1992 Svetlik et al.
5,184,534 A 2/1993 Lee
5,199,343 A 4/1993 OBanion
5,201,863 A 4/1993 Peot
5,230,269 A 7/1993 Shiotani et al.
5,231,906 A 8/1993 Kogej
5,257,570 A 11/1993 Shiotani et al.
5,265,510 A 11/1993 Hoyer-Ellefsen
5,272,946 A 12/1993 McCullough et al.
5,285,708 A 2/1994 Bosten et al.
5,293,802 A 3/1994 Shiontani et al.
5,331,875 A 7/1994 Mayfield
5,353,670 A 10/1994 Metzger, Jr.
5,377,571 A 1/1995 Josephs
5,392,678 A 2/1995 Sasaki et al.
5,401,928 A 3/1995 Kelley
5,447,085 A 9/1995 Gochnauer
5,480,009 A 1/1996 Wieland et al.
5,513,548 A 5/1996 Garuglieri
5,531,147 A 7/1996 Serban
5,572,916 A 11/1996 Takano
5,619,896 A 4/1997 Chen
5,623,860 A 4/1997 Schoene et al.
5,647,258 A 7/1997 Brazell et al.
5,720,213 A 2/1998 Sberveglieri
5,724,875 A 3/1998 Meredith et al.
5,755,148 A 5/1998 Stumpf et al.
5,768,786 A 6/1998 Kane et al.
5,782,001 A 7/1998 Gray
5,787,779 A 8/1998 Gantglieri
5,791,223 A 8/1998 Lanzer
5,791,224 A 8/1998 Suzuki et al.
5,819,619 A 10/1998 Miller et al.
5,819,625 A 10/1998 Sberveglieri
5,857,507 A 1/1999 Puzio et al.
5,937,720 A 8/1999 Itzov
5,941,153 A 8/1999 Chang
5,943,932 A 8/1999 Sberveglieri
5,950,514 A 9/1999 Benedict et al.
5,989,116 A 11/1999 Johnson et al.
6,037,729 A 3/2000 Woods et al.
D422,290 S 4/2000 Welsh et al.
6,109,157 A 8/2000 Talesky
6,131,629 A 10/2000 Puzio et al.
6,148,526 A 11/2000 Kirn et al.
6,170,370 B1 1/2001 Sommerville
6,405,624 B2 6/2002 Sutton
6,418,829 B1 7/2002 Pilchowski
6,427,570 B1 8/2002 Miller et al.
6,460,442 B2 10/2002 Talesky et al.
6,463,840 B1 10/2002 Chang
D466,913 S 12/2002 Ceroll et al.
6,502,493 B1 1/2003 Eccardt et al.
6,543,324 B2 4/2003 Dils
6,546,835 B2 4/2003 Wang
6,578,460 B2 6/2003 Sartori
D478,917 S 8/2003 Ceroll et al.
6,601,493 B1 8/2003 Crofutt
6,607,015 B1 8/2003 Chen
D479,538 S 9/2003 Welsh et al.
6,619,348 B2 9/2003 Wang
6,644,157 B2 11/2003 Huang
6,722,242 B2 4/2004 Chuang
6,736,042 B2 5/2004 Behne et al.
6,742,430 B2 6/2004 Chen
6,796,208 B1 9/2004 Jorgensen
6,826,988 B2 12/2004 Gass et al.
6,826,992 B1 12/2004 Huang
6,840,144 B2 1/2005 Huang
6,874,397 B2 4/2005 Chang
6,874,399 B2 4/2005 Lee
6,877,410 B2 4/2005 Gass et al.
6,880,440 B2 4/2005 Gass et al.
6,889,585 B1 5/2005 Harris et al.
6,920,814 B2 7/2005 Gass et al.
6,945,148 B2 9/2005 Gass et al.
6,957,601 B2 10/2005 Gass et al.
6,986,370 B1 1/2006 Schoene et al.
7,000,514 B2 2/2006 Gass et al.
7,055,417 B1 6/2006 Gass et al.
7,137,326 B2 11/2006 Gass et al.
7,210,386 B1 * 5/2007 Chang .................. B23D 47/025 83/102.1
7,475,622 B1 * 1/2009 Chang .................... B27G 19/02 83/477.2
7,621,204 B2 * 11/2009 Merhar, III ............ B27G 19/08 83/102.1
7,665,393 B2 * 2/2010 O'Banion .............. B27G 19/02 144/251.1
8,297,159 B2 * 10/2012 Voruganti .............. B27G 19/02 83/477.2
8,413,560 B2 * 4/2013 Liao ....................... B27G 19/08 83/102.1
8,505,424 B2 8/2013 Gass et al.
9,254,580 B2 * 2/2016 Frolov ................... B27G 19/02
2001/0035081 A1 11/2001 Sutton
2002/0017175 A1 2/2002 Gass et al.
2002/0017179 A1 2/2002 Gass et al.
2002/0017181 A1 2/2002 Gass et al.
2002/0017336 A1 2/2002 Gass et al.
2002/0020265 A1 2/2002 Gass et al.
2002/0050201 A1 5/2002 Lane et al.
2002/0056348 A1 5/2002 Gass et al.
2002/0056349 A1 5/2002 Gass et al.
2002/0059853 A1 5/2002 Gass et al.
2002/0059854 A1 5/2002 Gass et al.
2002/0069734 A1 6/2002 Gass et al.
2002/0088325 A1 7/2002 Talesky et al.
2002/0096030 A1 7/2002 Wang
2002/0170399 A1 11/2002 Gass et al.
2002/0170400 A1 11/2002 Gass
2002/0174755 A1 11/2002 Behne et al.
2002/0190581 A1 12/2002 Gass et al.
2003/0019341 A1 1/2003 Gass et al.
2003/0037655 A1 2/2003 Chin-Chin
2003/0089212 A1 5/2003 Parks et al.
2003/0101857 A1 6/2003 Chuang
2003/0131703 A1 7/2003 Gass et al.
2004/0011177 A1 * 1/2004 Huang ................... B27G 19/02 83/478
2004/0040426 A1 3/2004 Gass et al.
2004/0103544 A1 6/2004 Hartmann
2004/0118261 A1 * 6/2004 Garcia ................. B23D 45/067 83/471.3
2004/0159198 A1 8/2004 Peot et al.
2004/0194594 A1 10/2004 Dils et al.
2004/0200329 A1 10/2004 Sako
2004/0226424 A1 11/2004 O'Banion et al.
2004/0255745 A1 12/2004 Peot et al.
2005/0057206 A1 3/2005 Uneyama

(56) References Cited

U.S. PATENT DOCUMENTS

| | | | | | |
|---|---|---|---|---|---|
| 2005/0066784 | A1 | 3/2005 | Gass | | |
| 2005/0087049 | A1 | 4/2005 | Miller | | |
| 2005/0139057 | A1 | 6/2005 | Gass et al. | | |
| 2005/0166736 | A1 | 8/2005 | Gass et al. | | |
| 2005/0178259 | A1 | 8/2005 | Gass et al. | | |
| 2005/0188806 | A1 | 9/2005 | Garcia et al. | | |
| 2005/0204885 | A1 | 9/2005 | Gass et al. | | |
| 2005/0211034 | A1 | 9/2005 | Sasaki et al. | | |
| 2005/0235793 | A1 | 10/2005 | O'Banion et al. | | |
| 2006/0000337 | A1 | 1/2006 | Gass | | |
| 2006/0032352 | A1 | 2/2006 | Gass et al. | | |
| 2006/0219076 | A1 | 10/2006 | Gass et al. | | |
| 2006/0225551 | A1 | 10/2006 | Gass | | |
| 2006/0230896 | A1 | 10/2006 | Gass | | |
| 2007/0028733 | A1 | 2/2007 | Gass | | |
| 2007/0186739 | A1* | 8/2007 | Peot | B27G 19/08 | 83/102.1 |
| 2008/0047410 | A1* | 2/2008 | Chuang | B27G 19/10 | 83/469 |
| 2008/0168875 | A1* | 7/2008 | Liu | B27G 19/08 | 83/415 |
| 2009/0145275 | A1* | 6/2009 | Chuang | B27G 19/08 | 83/102 |
| 2009/0241745 | A1* | 10/2009 | Keller | B27G 19/02 | 83/102.1 |
| 2009/0266213 | A1* | 10/2009 | Liu | B27B 5/222 | 83/471.2 |
| 2009/0288303 | A1* | 11/2009 | Liao | B26D 7/00 | 30/293 |
| 2010/0126324 | A1* | 5/2010 | Liu | B27G 19/10 | 83/438 |
| 2011/0048204 | A1* | 3/2011 | Chung | B23D 45/067 | 83/477.1 |
| 2011/0072943 | A1* | 3/2011 | Chen | B27G 19/08 | 83/102.1 |
| 2011/0154967 | A1* | 6/2011 | Chiu | B27G 19/08 | 83/102.1 |
| 2011/0167976 | A1* | 7/2011 | Liu | B27G 19/02 | 83/102.1 |
| 2016/0067880 | A1* | 3/2016 | Frolov | B27G 19/02 | 83/102.1 |

FOREIGN PATENT DOCUMENTS

| | | | |
|---|---|---|---|
| DE | 317732 | | 9/1983 |
| DE | 3427733 | | 1/1986 |
| DE | 4205965 | C1 | 2/1992 |
| DE | 19609771 | | 6/1998 |
| DE | 20102704 | | 2/2001 |
| FR | 2556643 | | 6/1985 |
| FR | 2570017 | | 3/1986 |
| GB | 1132708 | | 11/1968 |
| JP | 06328359 | | 11/1994 |
| JP | 2005262337 | | 9/2005 |

OTHER PUBLICATIONS

Inca 2100SE Professional Tablesaw Owners Manual, Injecta Machinery, 1992.
Inca 2200 Table Saw Photo of Internal Mechanisms, around 1992.
Inca 2100SE Blade Guard Photos, 1992.
Skil Model 3400-Type 1 10" Table Saw Parts List and Technical. Bulletin, S-B Power Tool Company, Jun. 1993.
Shop Fox® Fence Operating Manual, Woodstock International, Inc., 1996, revised May 1997.
SI320 Circular with Tilting Blade Spare Parts Catalogue, SCM, Dec. 23, 1998.
SI3200/3800 Circular with Tilting Blade Spare Parts Catalogue, SCM, Dec. 23, 1998.
Grizzly Industrial, Inc. Heavy-Duty 12" Table Saw Model G5959 and G9957 Parts List, 1998 and Oct. 2001.
Cabinet Saw Test, Barrett et al., *Fine Woodworking*, No. 136, Jun. 1999.
Altendorf publication, Wilhelm Altendorf GmbH & Co. KG, Minden, Germany, 1999.
U.S. Appl. No. 60/182,866, filed Feb. 16, 2000, entitled "Fast-Acting Safety Stop."
Bosch Model 4000 Worksite Table Saw Operating/Safety Instructions, S-B Power Tool Company, Jul. 2000.
IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
Excaliber T-Slot Precision Saw Fence Model TT45 Owner's Manual, Sommerville Design & Manufacturing, Inc., May 2000.
SI300N Circular with Tilting Blade Spare Parts Catalogue, SCM, Jun. 12, 2000.
SawStop Descriptions of Safety Systems for Power Equipment, Aug. 14, 2000.
SI400N Circular with Tilting Blade Spare Parts Catalogue, SCM, Sep. 19, 2000.
DeWalt Woodworker's Table Saw DW746 Instruction Manual, DeWalt Industrial Tool Co., 2000.
SC 3W Circular Saw Manual, SCM Group S.p.A. Divisione Minimax—Samco, Feb. 2001.
XACTA Fence II™ Homeshop 30/52 Owner's Manual, JET Equipment & Tools, Mar. 2001.
Biesemeyere® T-Square® Universal Home Shop Fence system Instruction Manual, Delta Machinery, Jun. 1, 2001.
XACTA Fence II™ Commercial 30/50 Owner's Manual, JET Equipment & Tools, Mar. 2001.
Ryobi 10" Table Saw BT3000 Operator's Manual, Ryobi Technologies, Inc., Mar. 2001.
SI450E Circular with Tilting Blade Spare Parts Catalogue, SCM, Apr. 26, 2001.
Tablesaw Splitters and Blade Covers, *Fine Woodworking*, pp. 77-81, Dec. 2001.
*Bosch 10" Table Saw Model 0601476139 Parts List and Technical Bulletin*, S-B Power Tool Company, Apr. 2001.
*Powermatic 10" Tilting Arbor Saw Model 66 Instruction Manual & Parts List*, JET Equipment & Tools, Jun. 2001.
*Skil Model 3400 Table Saw Operating/Safety Instructions*, S-B Power Tool Co., Sep. 2001.
Biesemeyer Splitters for Selected Table Saws, Biesemeyer, 2001.
The Merlin Splitter by Excalibur a Sommerville Design Product Overview & Generic Installation Notes, Sommerville Design & Manufacturing Inc., at least as early as 2002.
Ryobi 10" Table Saw BT3100 Operator's Manual, Ryobi Technologies, Inc., Aug. 2002.
Rojek KPF 300A-xxxx-RN-1P3 Table Saw/Shaper Combination Machine specification sheet, Sep. 30, 2002.
SI300S-S1300S4 Circular with Tilting Blade Spare Parts Catalogue, SCM, Oct. 30, 2003.
Rojek Circular Saw PK 300 Spare part catalogue, Apr. 14, 2003.
Ridgid TS3650 Operators Manual 10" Cast Iron Table Saw, May 2003, Jun. 2003 and Jul. 15, 2003.
Porter-Cable Double Insulated 10" Bench Top Table Saw Instruction Manual, Porter-Cable Corporation, Sep. 15, 2003.
ACCU-FENCE® 64A Fence and Rail System Owner's Manual, WMH Tool Group, Sep. 2004.
INCRA Incremental Micro Precision Table Saw Fence Owner's Manual, Taylor Design Group, Inc., 2003.
Craftsman® Power and Hand Tools, pp. 142-143, 2003.
Shop Fox® Models W2005, W2006, W2007 Classic Fence Instruction Manual, Woodstock International, Jan. 2000, revised Mar. 2004.
Makita Model 2704 Exploded Drawings and Parts List, Nov. 2005.
Unifence™ Saw Guide Instruction Manual, Delta Machinery, Feb. 22, 2005.
Biesemeyer® T-Square® Commercial Fence System Instruction Manual, Delta Machinery, May 2, 2005.
Delta Biesemeyer 10" Table Saw Blade Guard Systems Instruction Manual, Delta Machinery, May 9, 2005.

(56) References Cited

OTHER PUBLICATIONS

Young Inventor: Teen's Device Earns Her Trip to Science Fair, *The Arizona Republic*, May 5, 2006.
*Powermatic WMH Tool Group Operating Instructions and Parts Manual 10-inch Cabinet Saw Model 2000*, Nov. 2005.
*Porter-Cable 10" Portable Table Saw 3812*, Porter-Cable Corporation, 2005.
Laguna Tools table saw owner's manual, date unknown.
Porter Cable 10" Portable Table Saw Model 3812 Parts List with Guard Exploded View, 2005.
Grizzly Industrial, Inc. Model G0605X/G0606X Extreme Series 12" Table Saw Owner's Manual, Grizzly Industrial, Inc., Oct. 2006.
You Should Have Invented It, French television show DVD, date unknown.
Delta Biesemeyer T-Square, Anti-Kickback, Snap-In Spreader, Unisaw (Right Tilt) Model 78-961, Delta Machinery, undated.
Makita Table Saw 2704 Instruction Manual, Makita Corporation of America, date unknown.
SCM SI 450 Circular saw with tilting blade product brochure, Villa Verucchio, Italy, undated.
SCM Group publication, Rimini, Italy, undated.
*Active Safety System on a Table Saw*, Jan Nieberle & Sebastian Hauer, 1997 Workplace Bavaria.
*Powermatic, Accu-Fence for the Models 66, 72A & 74A Table Saws Instruction Manual & Parts List*, undated.
*Delta Biesemeyer T-Square, Anti-Kickback, Snap-In Spreader, 12"/14" Delta Tilting Arbor Saw Model 78-968*, Delta Machinery, undated.
*Delta Disappearing Splitter Model 34-868,* Delta Machinery, undated.

* cited by examiner

SYSTEMS TO MOUNT AND INDEX RIVING KNIVES AND SPREADERS IN TABLE SAWS

CROSS-REFERENCE TO RELATED APPLICATION

This application claims the benefit of and priority from U.S. Provisional Patent Application Ser. No. 61/892,246, filed Oct. 17, 2013, which is incorporated herein by reference.

TECHNICAL FIELD

The present specification relates to a mounting system to secure and index riving knives and spreaders in table saws.

BACKGROUND

A table saw is a power tool used to cut a work piece to a desired size or shape. A table saw includes a work surface or table and a circular blade extending up through the table. A person uses a table saw by placing a work piece on the table and feeding it into contact with the spinning blade to cut the work piece to a desired size. The table saw is one of the most basic machines used in woodworking.

If a work piece shifts slightly during a cut, it is possible for the teeth at the back of the blade to catch an edge of the work piece as the teeth on the spinning blade rise out of the table. The blade can then lift, spin and kick the work piece back toward the user at a high speed. This situation is called kickback, and it can potentially cause serious injury to the user. A riving knife or spreader can be mounted in a table saw to prevent the work piece from shifting and thereby help to prevent kickback. A riving knife or spreader is basically a thin, planar metal plate with a thickness slightly less than the kerf of the blade (i.e., the width of the teeth of the blade). The riving knife or spreader is mounted in the saw behind but relatively close to the blade. Typically, the riving knife or spreader is curved along a front edge to match the profile of the blade. As the work piece moves past the blade, the riving knife or spreader fits within the newly formed cut in the work piece and helps keep the work piece moving along a straight path without shifting or rotating.

This document describes mounting systems for securing a riving knife or spreader in a table saw. Specifically, this document describes clamping systems to mount a riving knife or spreader in a table saw, including in a jobsite table saw.

DETAILED DESCRIPTION

Figure 1:
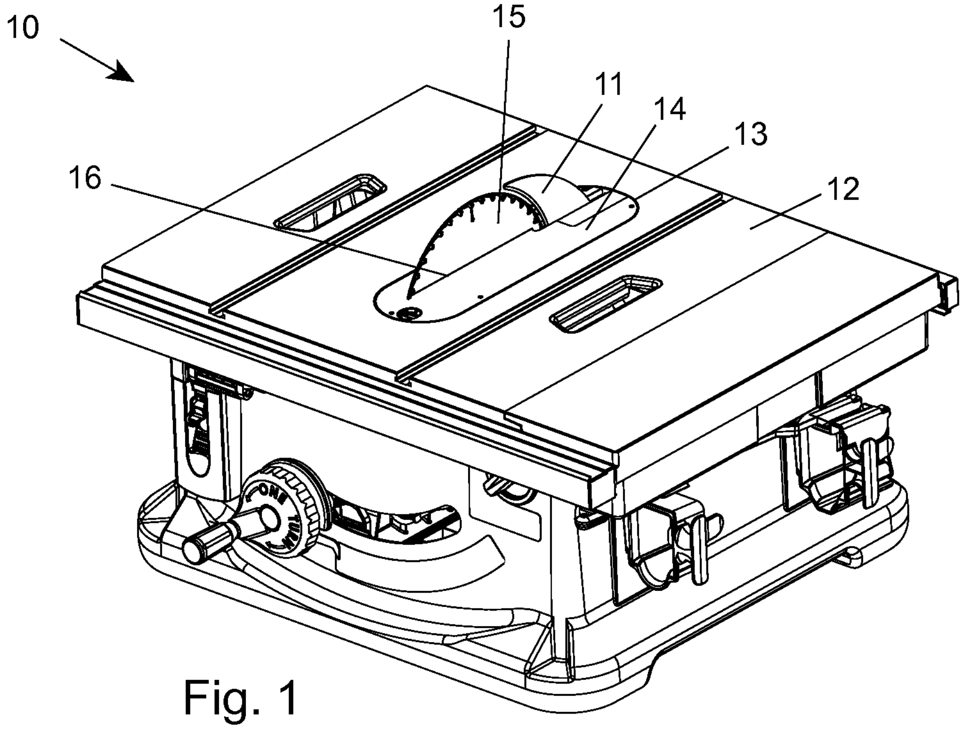
FIG. 1 shows a table saw with a riving knife installed.
Figure 2:
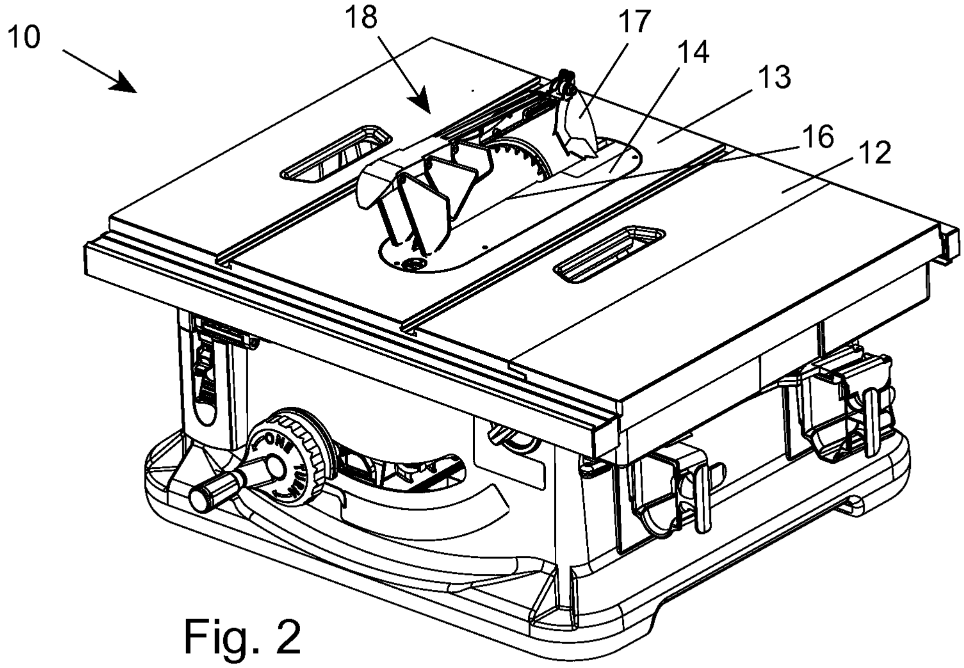
FIG. 2 shows a table saw with a spreader and blade guard.

FIG. 1 shows a table saw 10 with a riving knife 11. The table saw includes a table 12 with an opening 13 and an insert 14 in the opening. A blade 15 extends up through a slot 16 in the insert. Riving knife 11 is positioned adjacent the rear edge of the blade and extends up through slot 16 at the rear of the blade. FIG. 2 shows table saw 10 with a spreader 17 and a blade guard 18 instead of a riving knife. A spreader differs from a riving knife in that a spreader extends above the top of the blade to support a blade guard, while a riving knife remains below the top of the blade and within the kerf of the blade. Thus, a riving knife can be used for non-through cuts while a spreader cannot. (A non-through cut does not extend all the way through a work piece. A notch in a board is an example of a non-through cut.)

To use a table saw, a user places a work piece on the table and slides it into contact with the blade to make a cut. Typically the user guides the work piece past the blade with a fence or miter gauge, both of which are commonly used and well known in woodworking. (Neither a fence nor a miter gauge is shown in FIG. 1 or 2.) The fence or miter gauge helps maintain the position of the work piece relative to the blade, however, it is still possible for the work piece to shift or rotate to one side or the other. If that happens, the teeth at the rear edge of the blade can catch the work piece as the teeth rise out of slot 16 and kick the work piece back toward the front of the saw and the user. Riving knife 11 and spreader 17 minimize kickback by providing a surface to prevent the work piece from shifting. If a work piece began to shift, it would bump into a side of the riving knife or spreader and stop shifting before the teeth of the blade could catch an edge.

Figure 3:
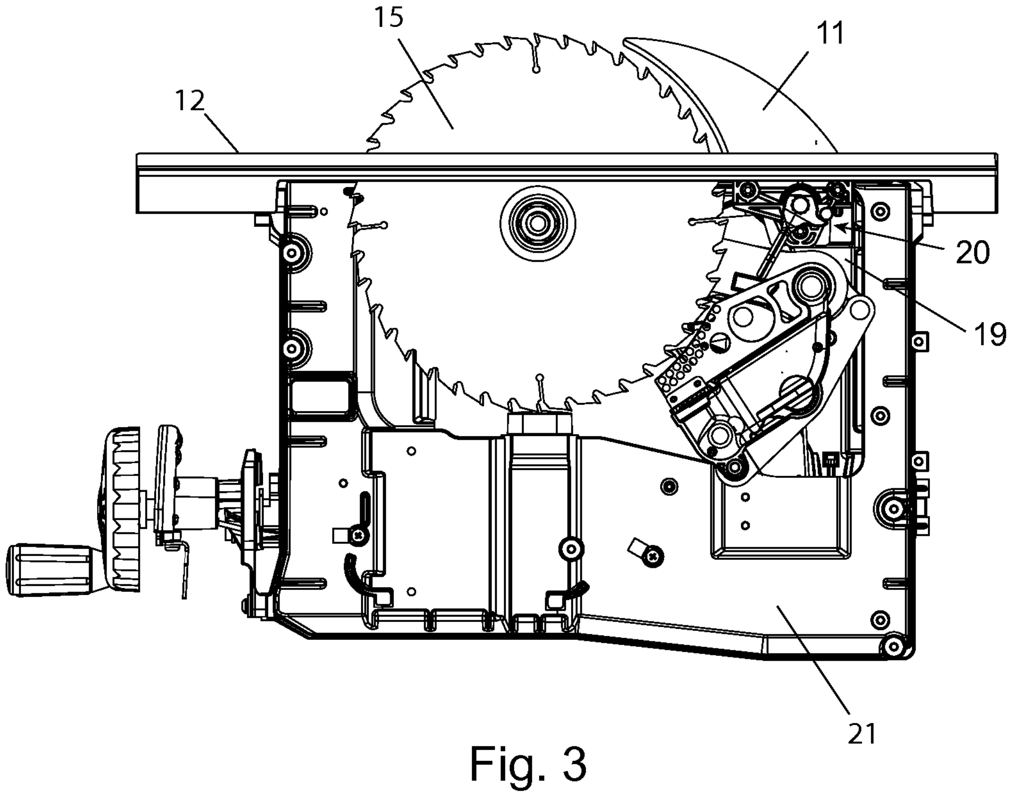
FIG. 3 shows an internal side view of the table saw of FIG. 1.
Figure 4:
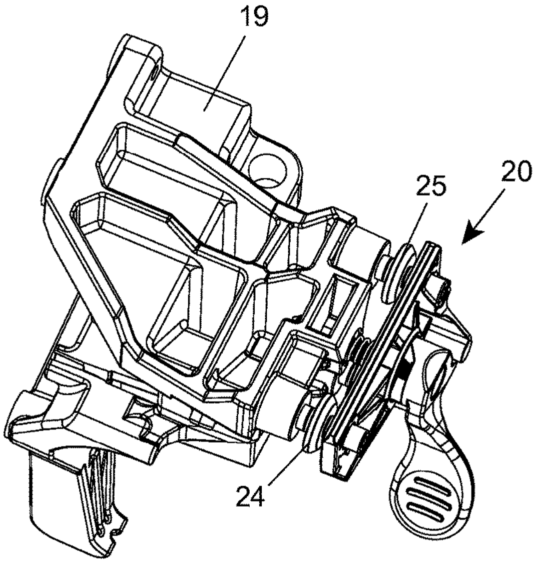
FIG. 4 shows a perspective view of a riving knife clamp attached to an elevation plate.
Figure 5:
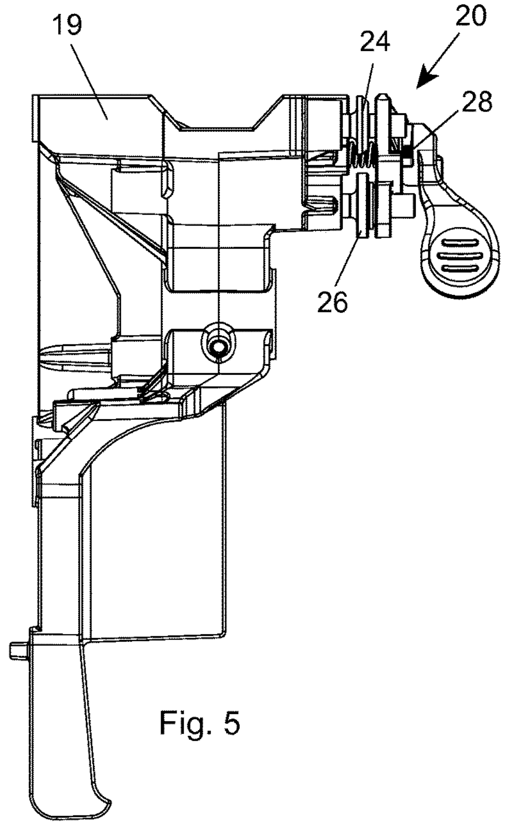
FIG. 5 shows a front view of a riving knife clamp attached to an elevation plate.
Figure 6:
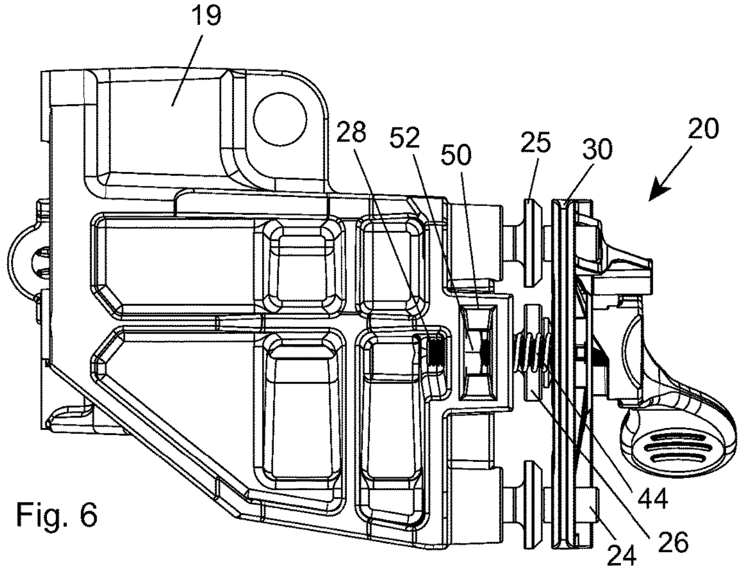
FIG. 6 shows a top view of a riving knife clamp attached to an elevation plate.

The blade in a table saw is typically supported in such a way that a user can change the elevation and tilt of the blade relative to the table. In doing so, if the blade were to move away from the riving knife or spreader, the effectiveness of the riving knife or spreader would be lessened because a work piece might then be able to shift into contact with the back of the blade. Accordingly, the riving knife or spreader should be mounted in the saw to move with the blade and to maintain its position relative to the blade. One way this is accomplished is by mounting the riving knife or spreader to the same structure that supports the blade. FIG. 3 is an internal view of a table saw showing a blade supported by an elevation carriage 19, which in turn is supported by a trunnion 21 hanging from table 12. The elevation carriage moves up and down relative to the trunnion to change the elevation of the blade relative to the table, and the elevation carriage and trunnion tilt or pivot from side to side to change the angle of the blade relative to the table.

Riving knife 11 is mounted to the elevation carriage so it moves with the blade. The riving knife is mounted to the elevation carriage by a clamp 20. Of course, clamp 20 would secure a spreader in the saw in the same way it secures the riving knife and a spreader could be shown instead of a riving knife. In the following discussion it should be understood that a spreader and blade guard could be substituted for a riving knife unless otherwise indicated.

Elevation carriage 19 and clamp 20 are shown isolated in FIGS. 4 through 7, and FIGS. 8 through 11 show clamp 20 without the elevation carriage. Clamp 20 is mounted to elevation carriage 19 by three custom mounts 24, 25 and 26 (the mounts may also be called screws or bolts), and by a bolt 28, as can be seen in the exploded view of FIG. 7. Mounts 24, and 26 thread into holes 32, 34 and 36, respectively, in elevation carriage 19. Holes 32 and 34 are along the same line near the top of the elevation carriage, one to the front and one to the rear, and hole 36 is below and between holes 32 and 34 so that the three holes form a triangle.

Clamp 20 includes a clamp plate 30 configured with holes so that the clamp plate can slide over and onto the heads of mounts 24, 25 and 26. Clamp 20 also includes a generally elongate clamp handle 40 with an aperture 38 at one end. Bolt 28 passes through aperture 38 in the handle, through a hole 42 in the middle of clamp plate 30, through a coil spring 44 which will be discussed below, through a portion of the elevation carriage 19, and then threads into a nut 52.

Figure 12:
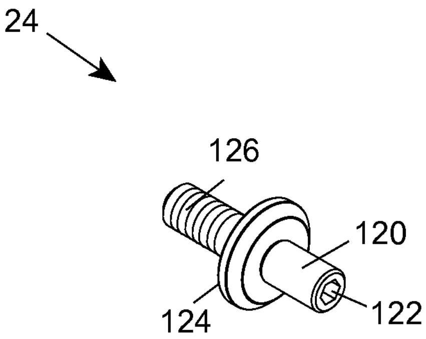
FIG. 12 shows a perspective view of a custom mounts or screw of the riving knife clamp of FIG. 3.
Figure 13:
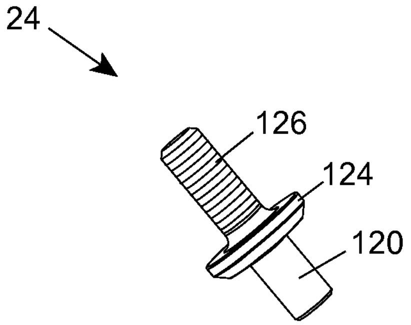
FIG. 13 shows a side view of the custom mount of FIG. 12.
Figure 14:
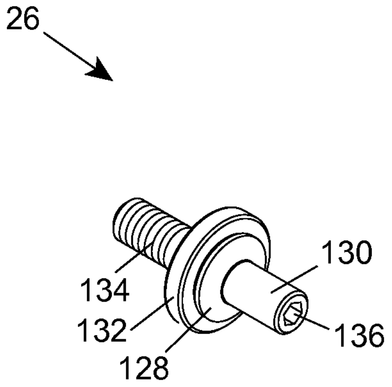
FIG. 14 shows a perspective view of another custom mount or screw of the riving knife clamp of FIG. 3 isolated.
Figure 15:
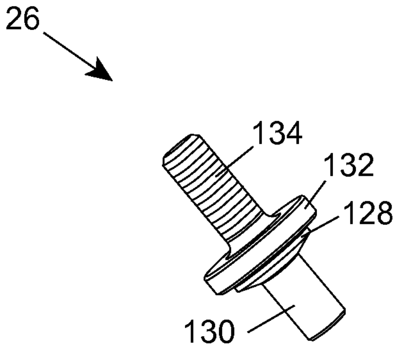
FIG. 15 shows a side view of the custom mount of FIG. 14 isolated.

Mounts 24, 25, which are identical, are shown by themselves in FIGS. 12 and 13. These mounts each includes a threaded portion 126 and a head portion comprising a cylindrical projection 120, a hex shaped recessed area 122, and a flange section 124. Mount 26 is shown isolated in FIGS. 14 and 15, and it includes a threaded section 134 like the threaded portion of mounts 24 and 25, but it includes a somewhat different head portion. Mount 26 includes a cylindrical projection 130 with a hex shaped recess 136 in the end of the projection. Mount 26 also includes an annular flange 132 and an annular shoulder 128 having a diameter less than the diameter of flange 132. Shoulder 128 is provided as a surface on which a riving knife may rest, as explained below.

Figure 16:
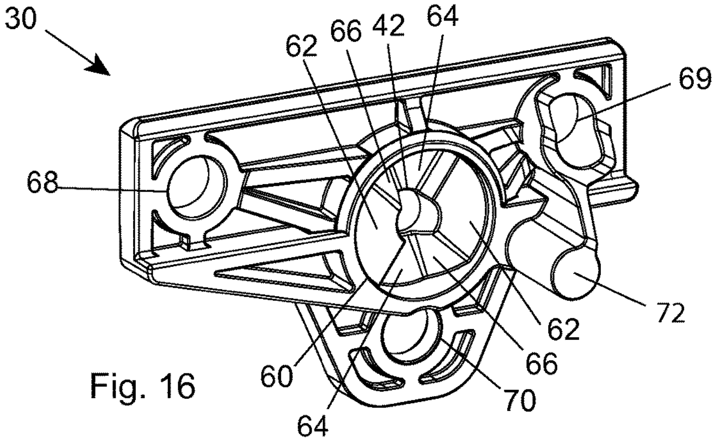
FIG. 16 shows a perspective view of a clamp plate.
Figure 17:
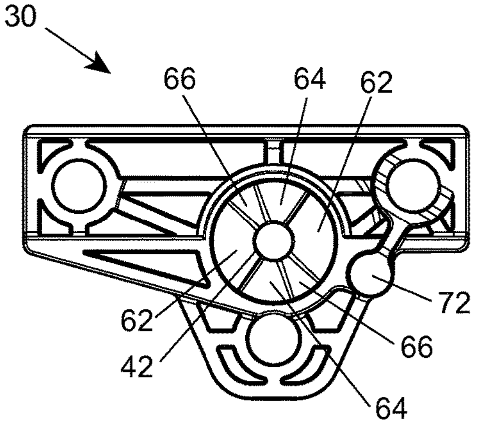
FIG. 17 shows a side of the clamp plate of FIG. 16.
Figure 18:
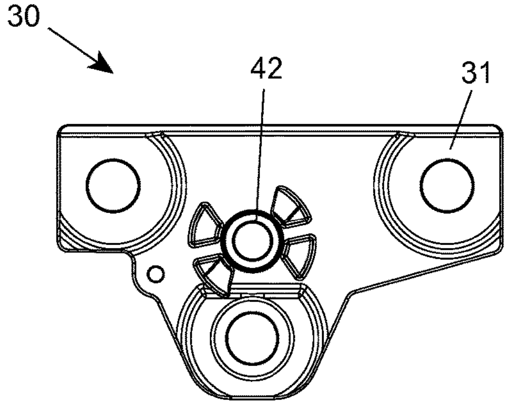
FIG. 18 shows a clamp surface on a side of the clamp plate of FIG. 16.
Figure 19:
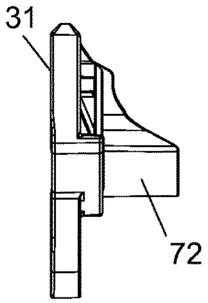
FIG. 19 shows another view of the clamp plate of FIG. 16.
Figure 20:
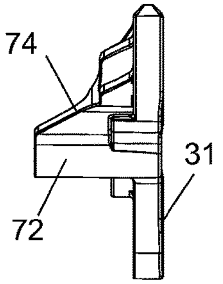
FIG. 20 shows yet another view of the clamp plate of FIG. 16.
Figure 21:
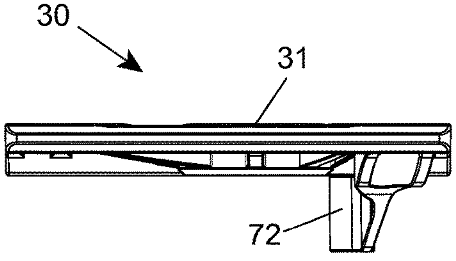
FIG. 21 shows a top view of the clamp plate of FIG. 16.
Figure 22:
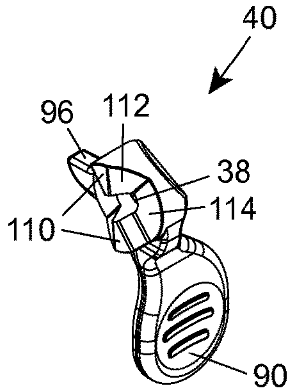
FIG. 22 shows a perspective view of a handle.
Figure 23:
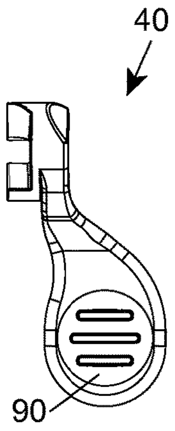
FIG. 23 shows a front view of the handle of FIG. 23.

Clamp plate 30 is shown by itself in FIGS. 16 through 21. It is a generally planar component made from plastic or metal, and with a clamping surface 31 on one side. Clamp plate 30 is positioned in clamp 20 so that clamping surface 31 faces the flanges on mounts 24, 25 and 26, thereby allowing the riving knife to be clamped between the flanges on the mounts and the clamping surface on the clamp plate. At least a portion of clamping surface 31 is configured to contact and press against the side of a riving knife, as explained below. Other portions of clamping surface 31 might be recessed to provide rigidity to the part during manufacturing and/or use (clamping surface 31 may be thought of as clamping surfaces because of depressions or indentations between different portions of the clamping surface, as seen in FIGS. 18 and 21).

Clamp plate 30 includes three apertures or holes 68, 69 and 70 to receive the cylindrical projections on the heads of mounts 24, 25 and 26, respectively. Clamp plate 30 slides over mounts 24, 25 and 26 by the cylindrical projections sliding through holes 68, 69 and 70 in the clamp plate.

Clamp 20 also includes a clamp handle 40, as mentioned previously, and the clamp handle is shown isolated in FIGS. 22 through 26. Handle 40 is generally elongate with a gripping pad 90 at one end, and may be made of plastic, metal, or some other suitable material. The end of the handle opposite the gripping pad includes a hole or aperture 38.

Figure 7:
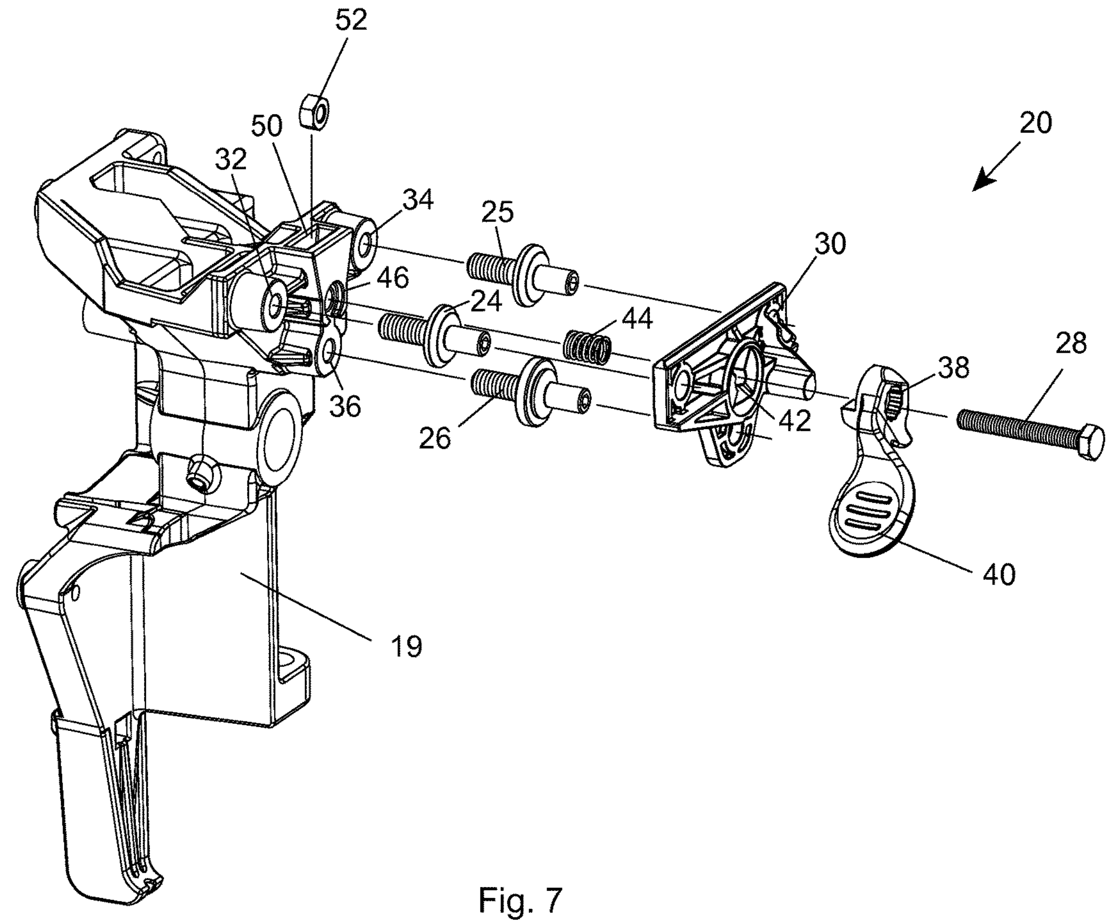
FIG. 7 shows an exploded view of the riving knife clamp of FIG. 4.
Figure 8:
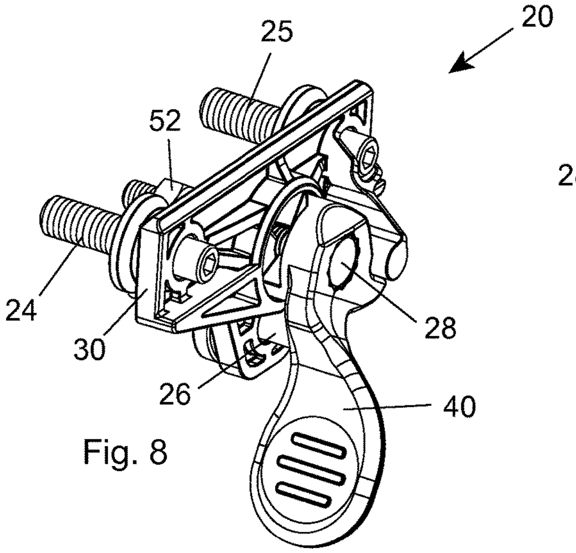
FIG. 8 shows a perspective view of the riving knife clamp of FIG. 3 isolated.
Figure 9:
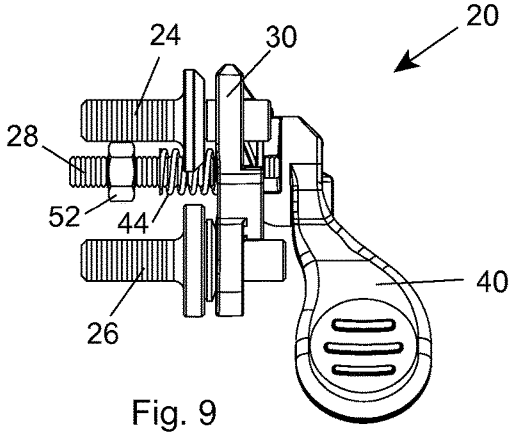
FIG. 9 shows a front view of the riving knife clamp of FIG. 3 isolated.
Figure 10:
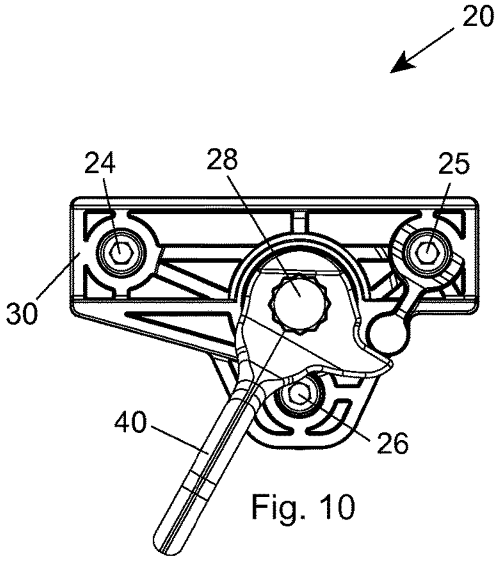
FIG. 10 shows a side view of the riving knife clamp of FIG. 3 isolated.
Figure 11:
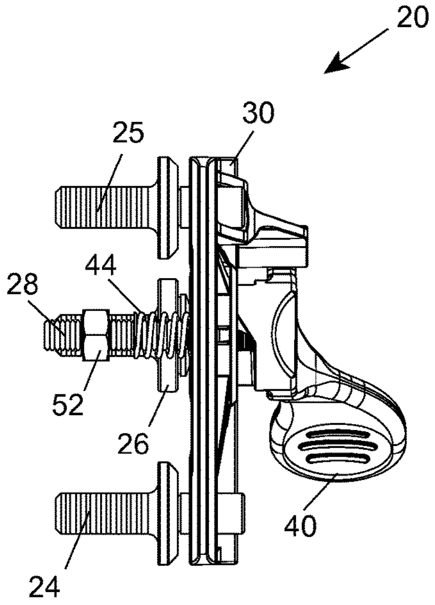
FIG. 11 shows a top view of the riving knife clamp of FIG. 3 isolated.
Figure 24:
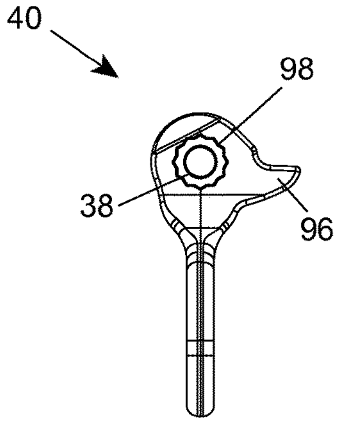
FIG. 24 shows a right side view of the handle of FIG. 23.
Figure 25:
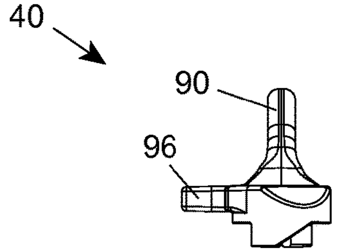
FIG. 25 shows a top view of the handle of FIG. 23.

Bolt 28 secures handle 40 and clamp plate 30 in the clamp by passing through hole 38 in the handle, through hole 42 in the clamp plate, and through a hole 46 in elevation plate 19 until the bolt can thread into a nut 52, as seen in FIG. 7. Elevation plate 19 is formed with a pocket 50 to receive bolt 52, and hole 46 passes through a wall of pocket 50 so that bolt 28 can thread into nut 52. Bolt 28 includes a hex head, and hole 38 in handle 40 includes shoulders 98, as seen in FIG. 24, to receive the bolt's hex head and hold it against rotation.

Figure 26:
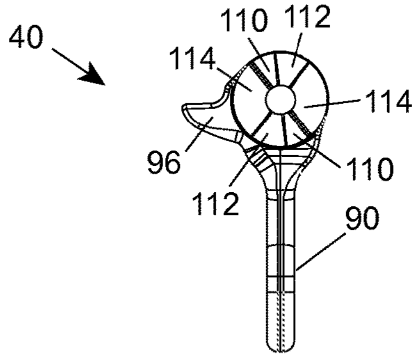
FIG. 26 shows a left side view of the handle of FIG. 23.

The end of handle 40 surrounding hole 38 is formed to create cam or clamping surfaces used to change rotational motion of the handle into generally linear motion of clamp plate 30. The cam surfaces comprise two projections formed by ramps 112 (which might also be called slopes or sloping surfaces) which slope up and then turn into flat surfaces 110. The ramps are spaced apart with spaces 114 between them, as seen in FIG. 26.

The cam surfaces in the handle mesh with similar cam surfaces in clamp plate 30. As seen in FIGS. 16 and 17, the cam surfaces in clamp plate 30 are generally in the center of the plate surrounding hole 42. The cam surfaces comprise two projections formed by ramps or sloping surfaces 66 which slope up and turn into flat surfaces 62. Spaces 64 separate the ramps, as seen in FIG. 17.

The cam surfaces in the handle and clamp plate are configured to mesh so that the two projections formed by ramps 112 on the handle fit into spaces 64 on the clamp plate, and the projections on the clamp plate fit into spaces 114 on the handle. With this configuration, rotation of the handle around an axis extending along the length of bolt 28 will cause ramps 112 on the handle so slide over ramps 66 on the clamp plate (because the clamp plate is held against rotation by mounts 24, 25 and 26) and ramps 112 will move or push clamp plate 30 toward the flanges on mounts 24, 25 and 26. Clamp plate 30 will continue to move toward the flanges on mounts 24, 25 and 26 until the handle rotates so far that flat surfaces 110 on the handle are over and against flat surfaces 64 on the clamp plate, at which time clamp 20 will be stable and effectively locked in place.

Clamp plate 30 includes a projection or stop 72 to limit the downward rotation of handle 40. Handle 40 includes a shoulder 96 configured to contact stop 72.

Figure 27:
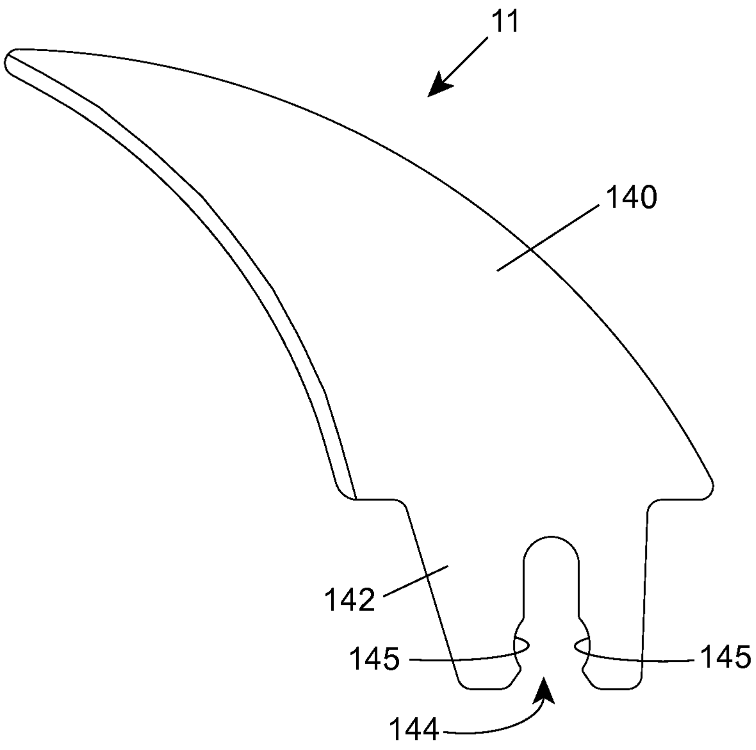
FIG. 27 shows a side view of a riving knife.
Figure 28:
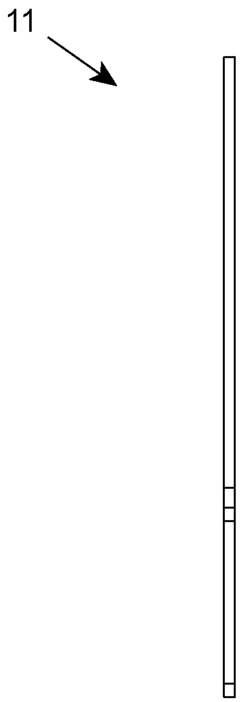
FIG. 28 shows a front view of the riving knife of FIG. 27.
Figure 29:
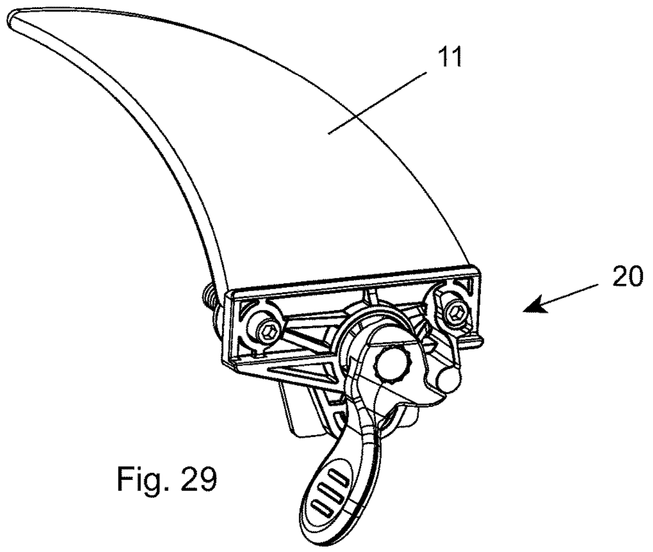
FIG. 29 shows a perspective view of a riving knife installed in a riving knife clamp.

A riving knife 11 is shown isolated in FIGS. 27 and 28. The riving knife is a generally flat, planar metal component with a top portion 140 shaped somewhat like a shark fin and a bottom portion 142 shaped to fit into clamp 20. If a spreader were shown instead of a riving knife, the spreader would have a base portion configured like base portion 142 so that the spreader would fit in clamp 20.

Figures 30, 31, 32:
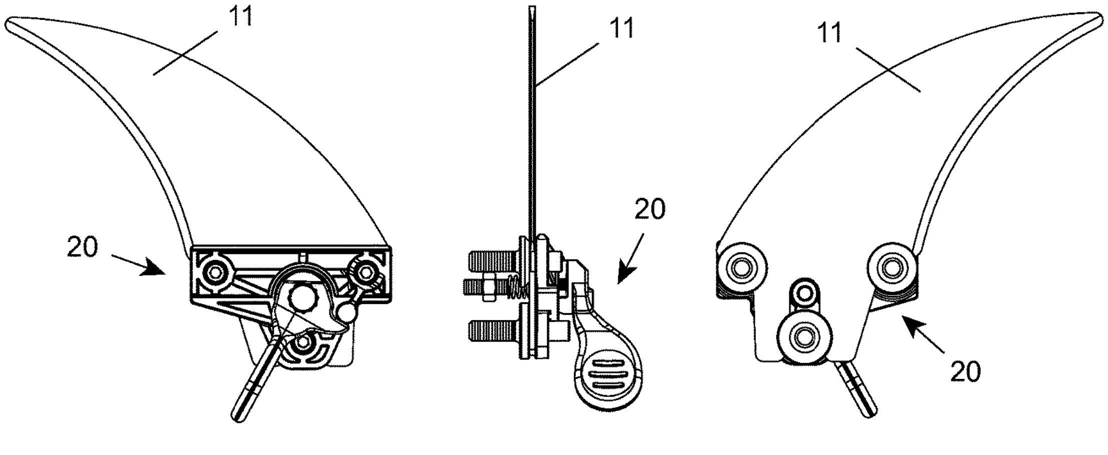
FIG. 30 shows a right side view of the riving knife and clamp shown in FIG. 29.
FIG. 31 shows a front view of the riving knife and clamp shown in FIG. 29.
FIG. 32 shows a left side view of the riving knife and clamp shown in FIG. 29.

FIGS. 29 through 32 show riving knife 11 installed in clamp 20. Base portion 142 of the riving knife is placed in the clamp between clamp plate 30 and the flanges on mounts 24, 25 and 26. Base portion 142 includes an opening 144 cutout so that the base portion can fit over and around bolt 28, as shown in FIG. 32. The sides of opening 144 includes concavities 145 shaped to fit around annular shoulder 128 on mount 26. The concavities position or index the riving knife in the clamp and hold it in position. To install the riving knife, a user would place the riving knife within the clamp with bolt 28 fitting within cutout 144 and with concavities 145 being adjacent annular shoulder 128 on mount 26. Annular shoulder 128, however, prevents the riving knife from sliding directly onto mount 26. Instead, the riving knife must be placed in the clamp so that opening 144 and concavities 145 in the base of the riving knife clear annular shoulder 128, and then the riving knife can be moved over the shoulder toward flange sections 124 of mounts 24, 25 and 26. Alternatively, the riving knife can be placed in the clamp to clear annular shoulder 128 and handle 40 can then be rotated to move the riving knife over the shoulder and against the flange sections on mounts 24, 25 and 26. Once the riving knife has moved against the flange sections and over shoulder 128, concavities 145 prevent the riving knife from moving up and out of the clamp.

Figure 33:
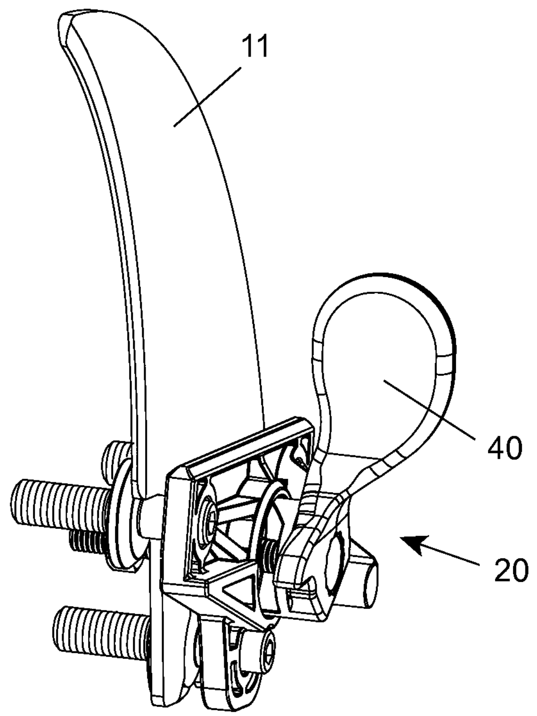
FIG. 33 shows a perspective view of the riving knife and clamp shown in FIG. 29, but with the clamp handle up.

FIG. 33 shows clamp 20 with riving knife 11 positioned in the clamp, but with handle 40 rotated up so the clamp is open. Coil spring 44, mentioned previously, surrounds bolt 28 with one end abutting elevation plate 19 and the other end abutting clamp plate 30. The spring is sized to bias clamp plate 30 away from elevation plate 19 so that the clamp opens when handle 40 is raised. When handle 40 pivots down, the cam surfaces on the handle and clamp plate cause the clamp plate to move toward the riving knife, thereby compressing the spring, and clamp the riving knife in place.

The clamping force of clamp 20 can be adjusted by moving nut 52 along the threaded shaft of bolt 28.

One advantage of a riving knife mount or clamp as described herein is that it can be easily adjusted to properly align the riving knife with the blade. It is important for the riving knife to be coplanar with the blade and within the kerf of the blade. If the riving knife were not coplanar with the blade, the riving knife could shift the work piece to the side as the work piece moved past the blade, and the work piece might bind between the riving knife and the fence. If the riving knife was outside the kerf of the blade, the work piece could bump into the riving knife as it moved past the blade during a cut.

In a riving knife mount as described herein, the riving knife can be aligned with the blade simply by turning one or more of mounts 24, 25 and 26 with a hex wrench until the riving knife is coplanar with the blade. The mounts can be screwed in or out until the flanges on the mounts define a plane coplanar with the blade so that when the riving knife or spreader clamps against the flanges, it is also coplanar with the blade. The positions of the mounts can be adjusted simply by screwing one or more of the mounts into or out of the threaded sockets in the elevation carriage with a wrench or driver, and the mounts are easily accessible through the opening in the table top so no disassembly of the saw is required to align the riving knife or spreader. The mounts can be held against vibration and becoming loose by using an adhesive or surface treatment such as Loctite, by using something like nylock, by tight threads, or by a jam nut on the threaded portions of the mounts to jam against a surface on the elevation carriage. The mounts also do not move up or down or forward or backward so the riving knife or spreader is indexed in position adjacent the blade and only the planarity of the riving knife or spreader to the blade is adjustable. This results in a riving knife mount or clamp having fewer and smaller parts than other mounts, and that is simple to manufacture and use.

Figure 34:
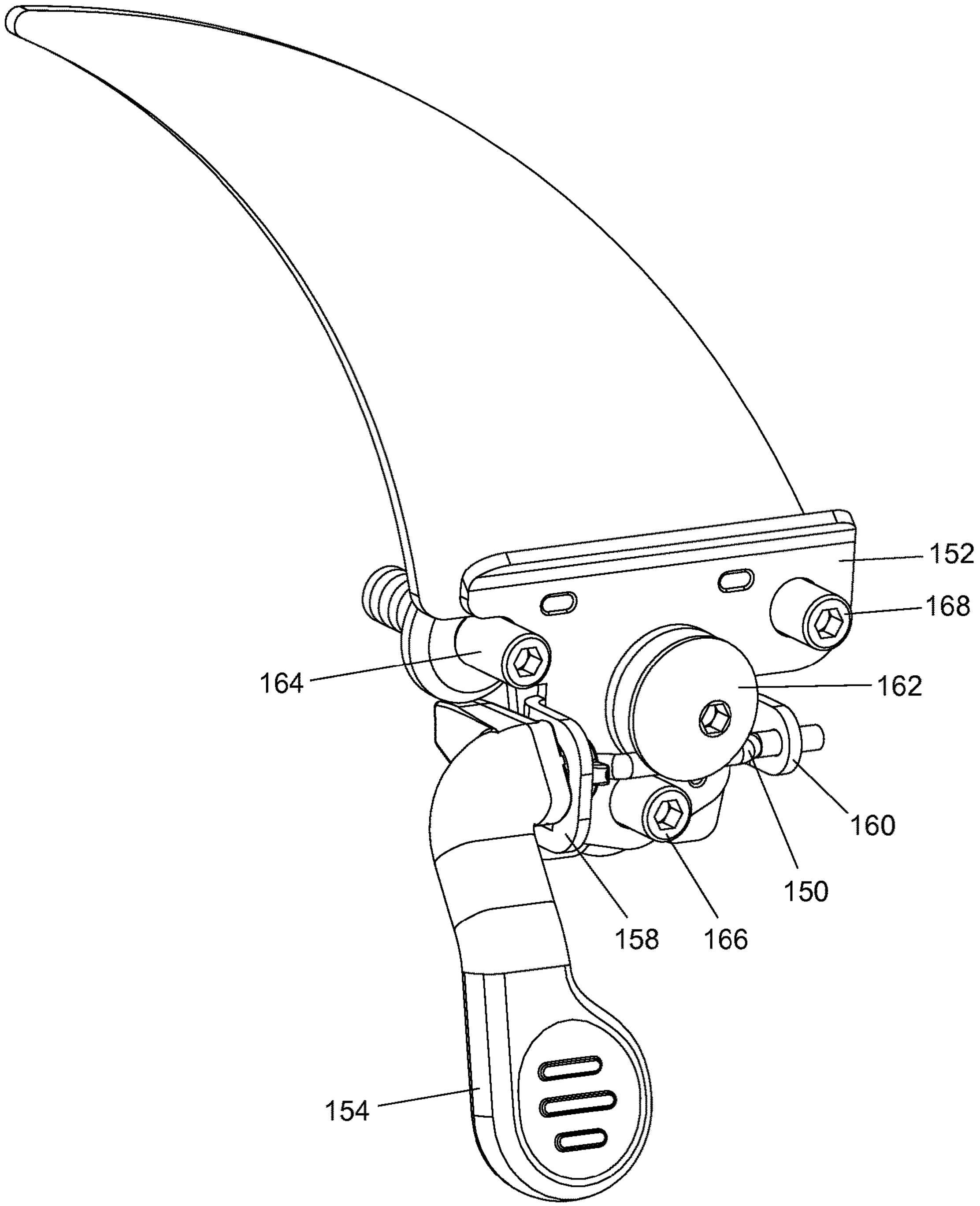
FIG. 34 shows an embodiment of a riving knife mount with a wire cam.
Figure 35:
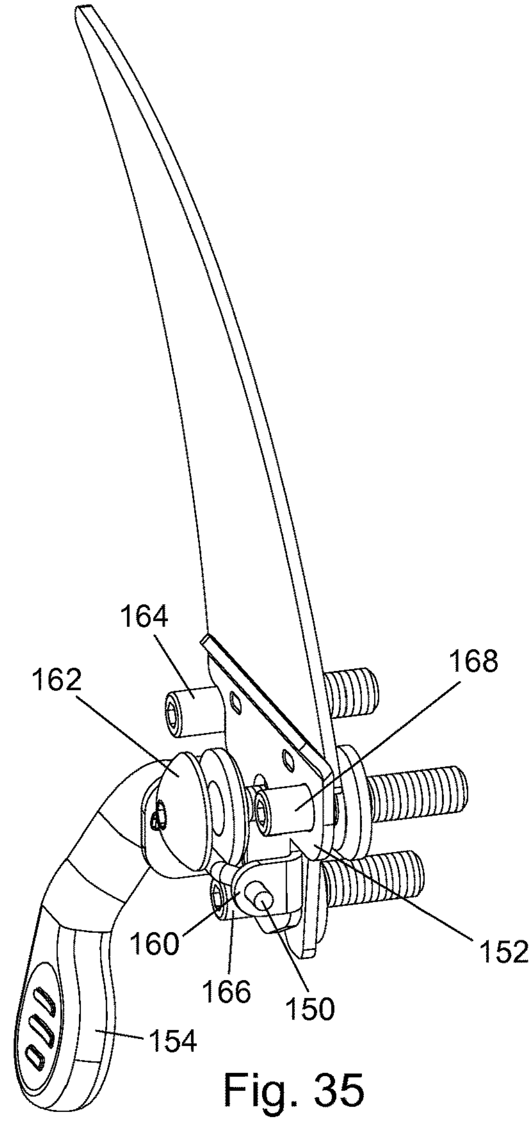
FIG. 35 shows a perspective view of the riving knife mount of FIG. 34.
Figure 36:
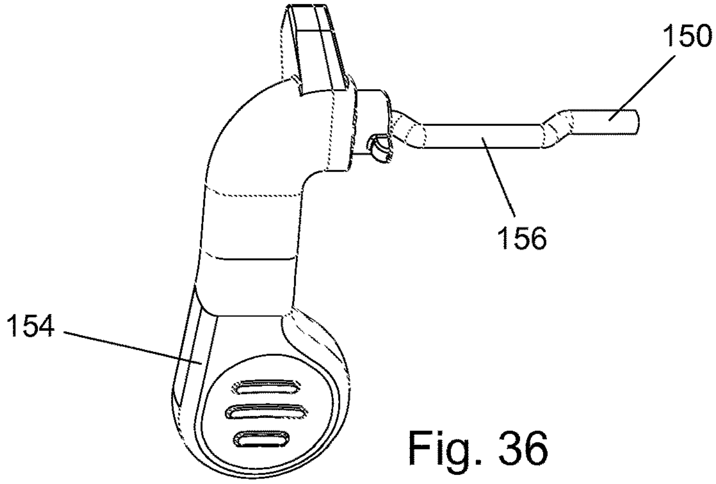
FIG. 36 shows a wire cam and handle used in the embodiment shown in FIG. 34.

FIGS. 34 and 35 show another embodiment of a riving knife mount. In this embodiment, a wire cam 150 moves a clamp plate 152 when a user pivots handle 154. Handle 154 and wire cam 150 are shown isolated in FIG. 36. Wire cam 150 includes an eccentric or "dog leg" section 156 that is offset relative to the ends of the wire cam. The ends of the wire cam are supported in brackets 158 and 160 which extend out from clamp plate 152, and eccentric section 156 of the wire cam fits into a slot in the head of a bolt 162. The bolt 162 threads into a socket in an elevation carriage or in a bracket supported by an elevation carriage and is thereby held in place. When a user pivots the handle, the ends of wire cam 150 move the clamp plate toward or away from the riving knife because the eccentric section of the wire cam is prevented from moving toward or away from the riving knife by the slot in bolt 162. The heads of mounting bolts 164, 166 and 168 hold the clamp plate in position, similar to the embodiment described above. Bolts 164, 166 and 168 thread into an elevation carriage or into a bracket supported by the elevation carriage, and the clamp plate can move toward and away from the riving knife but not up or down because of the mounting bolts. The slot in bolt 162 is sized to have enough clearance so that the eccentric section of the wire cam can move up into the slot as the wire cam rotates around an axis defined by the ends of the wire cam. The amount of clamping force provided by this embodiment can be adjusted by turning bolt 162. One advantage of this embodiment is that the wire cam is simple and inexpensive to manufacture.

Figure 37:
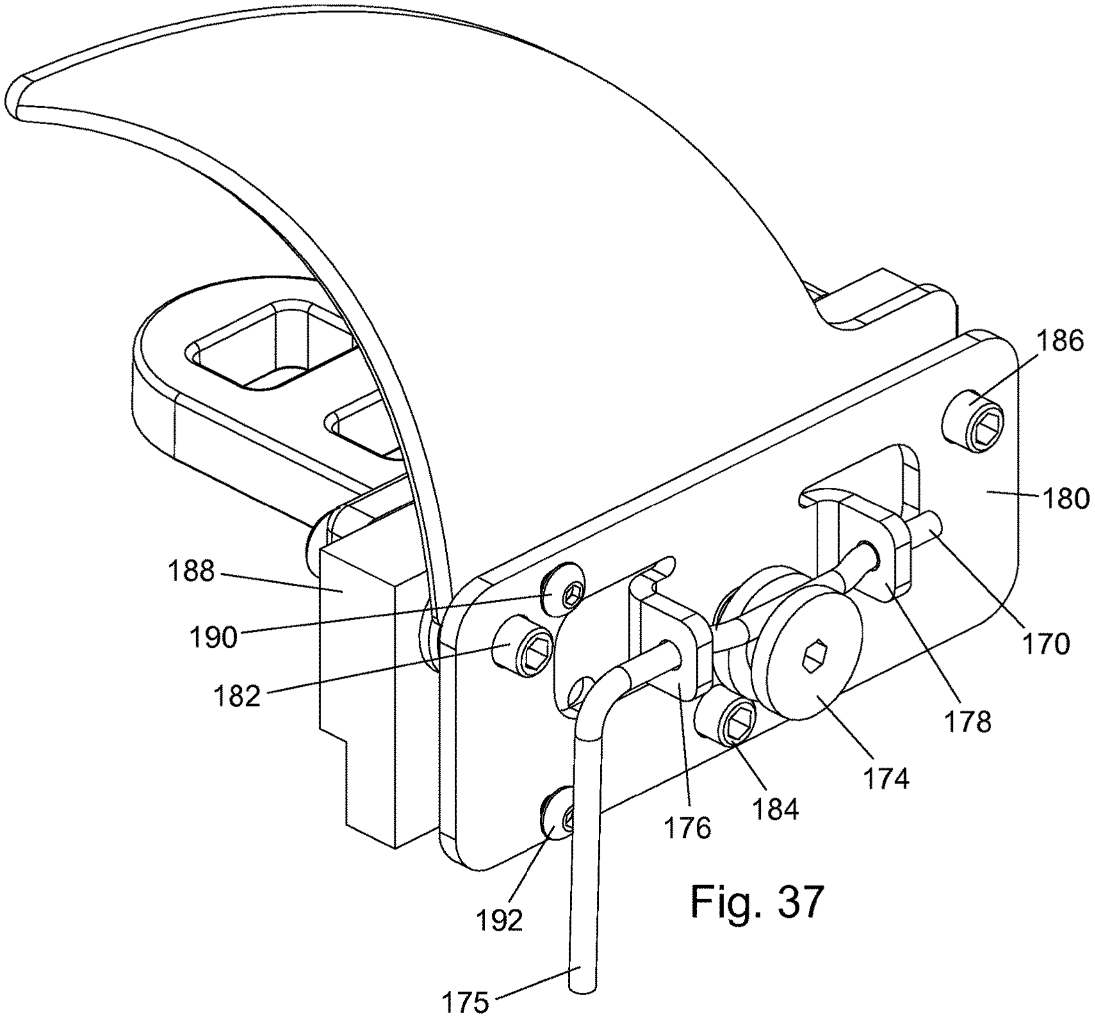
FIG. 37 shows another embodiment of a riving knife mount with a wire cam.
Figure 38:
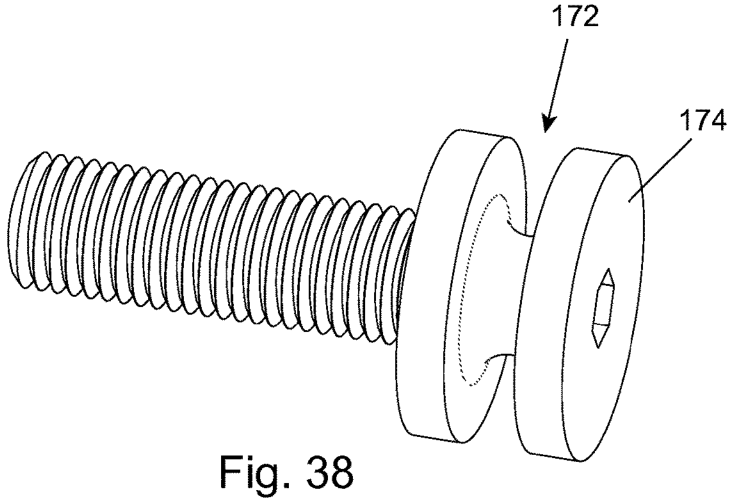
FIG. 38 shows a bolt used in the riving knife mount of FIG. 37.

FIG. 37 shows another embodiment of a riving knife mount with a wire cam 170 having an offset portion that fits into a slot 172 in the head of a bolt 174. Bolt 174 is shown isolated in FIG. 38. The wire cam is also bent to form a handle 175 that a user may grasp to rotate the wire cam, so a separate handle is not necessary. Wire cam 170 is supported by brackets 176 and 178 that extend out from a clamp plate 180, as shown, and the clamp plate is positioned on bolts 182, 184 and 186 which thread into a bracket assembly 188 that is mounted to an elevation carriage. Bolt 174 also threads into bracket assembly 188 and holds the offset portion of the wire cam from moving in or out. When a user pivots wire cam 170, the portions of the wire cam held in brackets 176 and 178 cause the clamp plate to move toward or away from the riving knife because the offset section of the wire cam is held in or constrained by slot 172 in bolt 174. The depicted embodiment also includes two screws 190 and

192 which thread into sockets in the clamp plate and which act as stops to limit the rotation of handle 175. The amount of clamping force provided by this embodiment can be adjusted by turning bolt 174. The planarity of the riving knife to the blade when clamped can be adjusted by turning one or more of bolts 182, 184 and 186. The riving knife can be further positioned relative to the blade by moving bracket assembly 188, or components of bracket assembly 188, similar to what is described in U.S. Pat. No. 8,505,424, titled "Table Saws With Safety Systems And Systems To Mount And Index Attachments," issued Aug. 13, 2013, the disclosure of which is incorporated herein by reference. This embodiment has the advantage of being simple and inexpensive to manufacture.

INDUSTRIAL APPLICABILITY

The systems described herein to mount and index riving knives and spreaders are applicable to woodworking power tool equipment, and particularly to table saws.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, the recitation of "a" or "a first" element, or the equivalent thereof, should be understood to include incorporation of one or more such elements, neither requiring nor excluding two or more such elements.

It is believed that the following claims particularly point out certain combinations and sub-combinations that are directed to disclosed inventions. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A table saw comprising:

a table defining a work surface;

a substantially planar, circular blade configured to extend at least partially above the work surface;

an elevation carriage;

a riving knife or spreader, where the riving knife or spreader defines a plane; and a clamp system supported by the elevation carriage, where the clamp system is configured to hold the riving knife or spreader adjacent the blade, where the clamp system includes a plurality of mounts, each mount having a head portion, a flange against which the riving knife or spreader is clamped by the clamp system, and a threaded portion adapted to screw into a socket associated with the elevation carriage, where the flange is between the head portion and the threaded portion, where the head portion is accessible by a user, where the clamp system also includes a clamping surface where the riving knife or spreader is clamped between the flanges and the clamping surface, and where the position of the plane of the riving knife or spreader relative to the blade when clamped in the clamp system can be adjusted by the user accessing the head portion to turn one or more of the mounts to reposition one or more flanges.

2. The table saw of claim 1, where the clamping surface is part of a clamp plate, where the clamp system further includes a handle, a bolt, and a nut, and where the bolt passes through the handle and clamp plate and threads into the nut.

3. The table saw of claim 2, where the clamping pressure applied by the clamp system can be adjusted by turning the nut on the bolt.

4. A clamp system for holding a riving knife or spreader in a table saw, where the riving knife or spreader defines a plane, the clamp system comprising: a plurality of mounts, each mount having a head portion, a clamping face against which the riving knife or spreader is clamped, and a threaded portion adapted to screw into a socket in the table saw, where the clamping face is between the head portion and the threaded portion, and where the head portion is accessible by a user; a clamp surface configured to work with the clamping face on each mount to clamp the riving knife or spreader therebetween; a handle configured to pivot; and a cam system configured to convert pivotal motion of the handle to linear motion of the clamp surface to effectuate clamping of the riving knife or spreader between the clamping faces and the clamp surface; where the position of the plane of the riving knife or spreader in the table saw when clamped between the clamping faces and the clamp surface can be adjusted by the user accessing the head portion to screw or unscrew at least one of the mounts further into or out of the mount's socket to reposition the mount's clamping face.

* * * * *